United States Patent
Kimelman et al.

(10) Patent No.: US 7,124,261 B2
(45) Date of Patent: Oct. 17, 2006

(54) ACCESS TO BIT VALUES WITHIN DATA WORDS STORED IN A MEMORY

(75) Inventors: Paul Kimelman, Alamo, CA (US); Ian Field, Walnut Creek, CA (US)

(73) Assignee: ARM Limited, Cambridge (GB)

( * ) Notice: Subject to any disclaimer, the term of this patent is extended or adjusted under 35 U.S.C. 154(b) by 433 days.

(21) Appl. No.: 10/773,453

(22) Filed: Feb. 9, 2004

(65) Prior Publication Data

US 2005/0177691 A1  Aug. 11, 2005

(51) Int. Cl.
*G06F 12/08* (2006.01)
(52) U.S. Cl. ........................ 711/155; 711/202
(58) Field of Classification Search ............. None
See application file for complete search history.

(56) References Cited

U.S. PATENT DOCUMENTS

| | | | | |
|---|---|---|---|---|
| 4,126,764 A | | 11/1978 | Downey et al. | |
| 4,615,018 A | * | 9/1986 | Sakano | 711/155 |
| 5,394,535 A | * | 2/1995 | Ohuchi | 711/155 |
| 5,809,273 A | * | 9/1998 | Favor et al. | 712/210 |
| 5,818,789 A | * | 10/1998 | Yung et al. | 365/230.06 |
| 5,918,075 A | | 6/1999 | Paysan | |
| 6,622,204 B1 | | 9/2003 | Jones et al. | |
| 2004/0139253 A1 | * | 7/2004 | Perego et al. | 710/71 |

* cited by examiner

*Primary Examiner*—Reginald G. Bragdon
*Assistant Examiner*—Daniel Ko
(74) *Attorney, Agent, or Firm*—Nixon & Vanderhye P.C.

(57) ABSTRACT

A data processing system 2 has a base data address region 24 and a bit-band data address region 28. Memory accesses to the bit-band data address region 28 are converted into memory accesses to the base data address region 24. In the process of this conversion specific bits within the base data address region 24 are picked out for access whether that be via a read-modify-write operation or a masked read operation as appropriate. In this way, bit access is provided to data values within the base data address region 24 by addressing specific address locations within the bit-band data address region 28.

22 Claims, 3 Drawing Sheets

ACCESS TO BIT VALUES WITHIN DATA WORDS STORED IN A MEMORY

BACKGROUND OF THE INVENTION

1. Field of the Invention

This invention relates to the field of data processing systems. More particularly, this invention relates to access to bit values within data words stored in a memory.

2. Description of the Prior Art

It is known to provide data processing systems with memories for storing data values to be manipulated. Such memories are typically arranged to store data values as 8-bit byte values. These 8-bit byte values (or greater) are written together and read together.

Within many data processing systems, there is a requirement to store data values that are smaller than one byte in length. Using a full byte of storage within a memory to store only one or a few bits of data is disadvantageously inefficient in terms of circuit area, cost, power consumption and in other ways. Furthermore, many non-memory devices require access to specific bits within control and status registers.

In order to reduce memory storage requirements it is known to store multiple data values within a single byte of memory storage. However, a disadvantage of this approach is that when it is desired to write or read such a data value from within a byte, additional processing steps are required to extract the portion of the data value concerned or to insert the portion of the data value concerned into the byte being accessed within the memory. These extra instructions disadvantageously slow execution and increase code size.

One known technique for addressing this problem is to add special purpose instructions for inserting certain bits or extracting certain bits into a byte or word value stored within a memory. However, the instruction bits space consumed by these special purpose instructions is a disadvantage. Furthermore, these are usually instructions used in addition to load and store so extra processing time is required. These extra instructions, whether separate instructions or part of the load and store, can still create read-modify-write problems due to interrupts splitting the read from the modify and then write.

Another known approach is that of the SHARC processor in which the same underlying memory can be accessed as either 16-bit, 32-bit or 40-bit words.

A further known approach is the Intel 8051 which provides a bit memory, but lacks the flexibility of a normal memory system.

SUMMARY OF THE INVENTION

Viewed from one aspect the present invention provides an apparatus for processing data, said apparatus comprising:

a memory operable to store data values; and memory accessing logic responsive to memory access instructions to access data values stored within said memory; wherein said memory has a first memory address region and a second memory address region;

said memory accessing logic is operable, in response to a memory access instruction specifying a first memory access to a first data value within said first memory address region, to convert said first memory access to a second memory access, said second memory access being to a second data value within said second memory address region;

when said first memory access is a memory write, said second memory access is a read-modify-write memory access in which Y bits within said first data value are written to Y bits within said second data value with those bits within said second data value other than said Y bits being unaltered; and when said first memory access is a memory read, said second memory access is a masked read memory access in which Y bits of said first data value are read from Y bits of said second data value and those bits within said first data value other than said Y bits are set to a predetermined value independent of bits of said second data value other than said Y bits.

The present technique provides a way in which standard memory access instructions can be used to address selected bit values within a stored data value through the use of a special purpose memory address region in which differing memory locations map to different bit portions of data values stored in another memory address region. This technique can be considered to obviate the need for special purpose bit accessing instructions by allowing the memory address being accessed within the special purpose memory region to effectively encode the additional bit addressing information within a standard memory access instruction and so allow this to be mapped to the desired bit accessing operation within the data values where the bits concerned are actually stored. The memory access to the bit values which is generated is in itself not a standard memory access in that for a write operation it performs a read-modify-write access as is appropriate to avoid altering other data stored within the memory location concerned and for a read access it performs a masked read so as to pick out only the bit values desired.

It will be appreciated that the number of bits it is desired to access within a data word can vary and in preferred embodiments this may be a user programmable value in the range between 1 and 8.

The data values addressed by the memory accesses can vary in size but will typically be 32, 16 or 8-bits in length.

Whilst it is possible that the bits to be accessed within a data value could be spread in arbitrary positions throughout that data value, it is simpler when the bits to be accessed together are contiguous within the data value concerned. In this way, the bottom 3, 4 or 5-bits of the first address encodes the starting bit in all cases.

The processing of data values to be written or read from bits within a stored data value is simplified when those bit values form the least significant bits of the first data value.

The present technique has particular applicability when the memory is a byte addressable memory and the number of bits to be accessed in one operation is less than eight.

In order to simplify interrupt behaviour, preferred embodiments are such that the read-modify-write memory access is performed as an atomic operation.

It will be appreciated that since the first memory access is converted to another form prior to being physically issued on an associated memory bus structure, it is possible that the first memory access is unaligned with the second memory access being appropriately realigned to match the bus structure provided.

Viewed from another aspect the present invention provides a method of processing data, said method comprising the steps of:

storing data values within a memory; and in response to memory access instructions, accessing data values stored within said memory; wherein said memory has a first memory address region and a second memory address region;

in response to a memory access instruction specifying a first memory access to a first data value within said first memory address region, converting said first memory access to a second memory access, said second memory access being to a second data value within said second memory address region;

when said first memory access is a memory write, said second memory access is a read-modify-write memory access in which Y bits within said first data value are written to Y bits within said second data value with those bits within said second data value other than said Y bits being unaltered; and when said first memory access is a memory read, said second memory access is a masked read memory access in which Y bits of said first data value are read from Y bits of said second data value and those bits within said first data value other than said Y bits are set to a predetermined value independent of bits of said second data value other than said Y bits.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
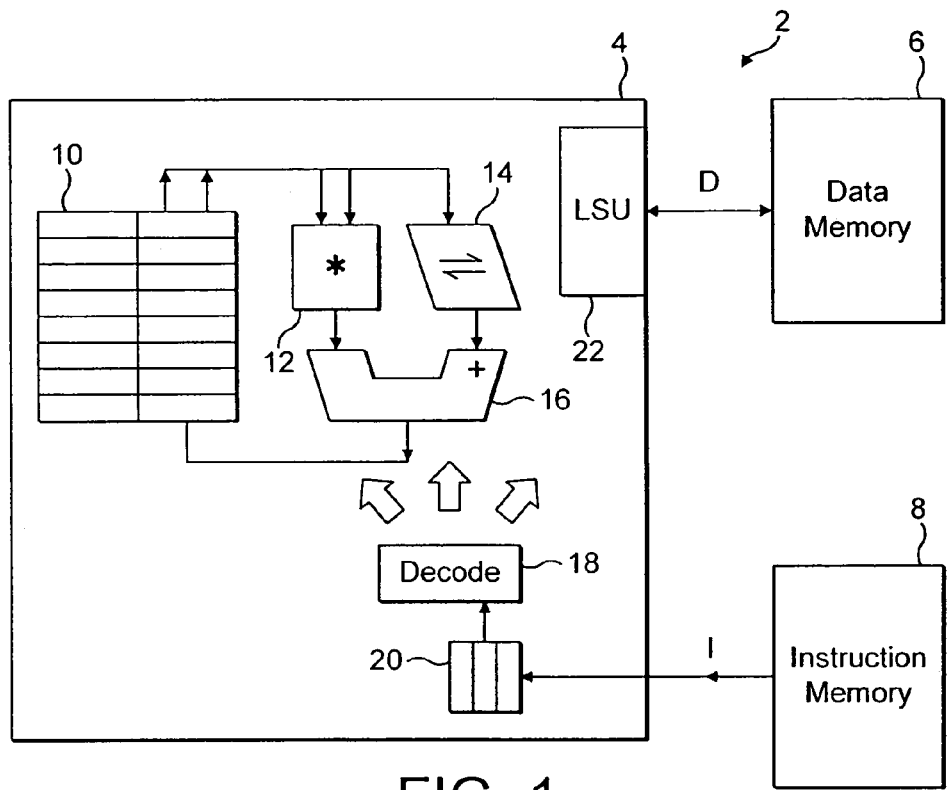
FIG. 1 schematically illustrates a data processing system including a memory for storing data values.

FIG. 1 schematically illustrates a data processing system 2 including a processor core 4, a data memory 6 and an instruction memory 8.

The processor core 4 includes processing logic including a register bank 10, a multiplier 12, a shifter 14 and an adder 16. The processing logic 10, 12, 14, 16 operates under control of control signals generated by an instruction decoder 18 which is itself responsive to instructions within an instruction pipeline 20. The instructions loaded to the pipeline 20 are retrieved from the instruction memory 8.

The instruction decoder 18 is responsive to memory access instructions to generate control signals which operate to control a load store unit 22 within the processor core 4. The load store unit 22 performs data value read and data write operations within the data memory 6. In accordance with the techniques described below, the load store unit 22, or alternatively a separate unit between the load store unit 22 and the data memory 6, provides a conversion of memory accesses made to a first memory address region into memory accesses to a second memory address region that pick out particular bits within the data values stored in the data memory 6.

Figure 2:
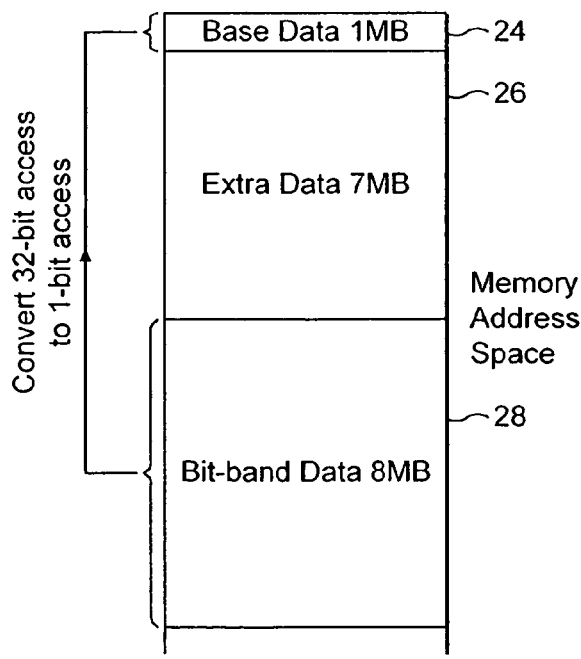
FIG. 2 schematically illustrates a portion of the memory address space/map for the system of FIG. 1.

FIG. 2 schematically illustrates a portion of the memory address map for the system of FIG. 1. This is the data address map and includes a base data region 24, an extra data region 26 and a bit-band data region 28. The load store unit 22 is operable to interpret/convert memory access instructions to the bit-band data region 28 into memory accesses to the base data region 24. Each byte within the bit-band data region 28 in this example maps to a particular bit within a byte value in the base data region 24. In the example processor of FIG. 1, the data accesses are 8-bit data accesses with the least significant bit of a data access to the bit-band data region 28 mapping to a particular bit within a byte data value of the base data region 24. Thus, by addressing an appropriate byte within the bit-band data region 28, a programmer can effectively access an individual bit within a data value within the base data region 24.

Figure 3:
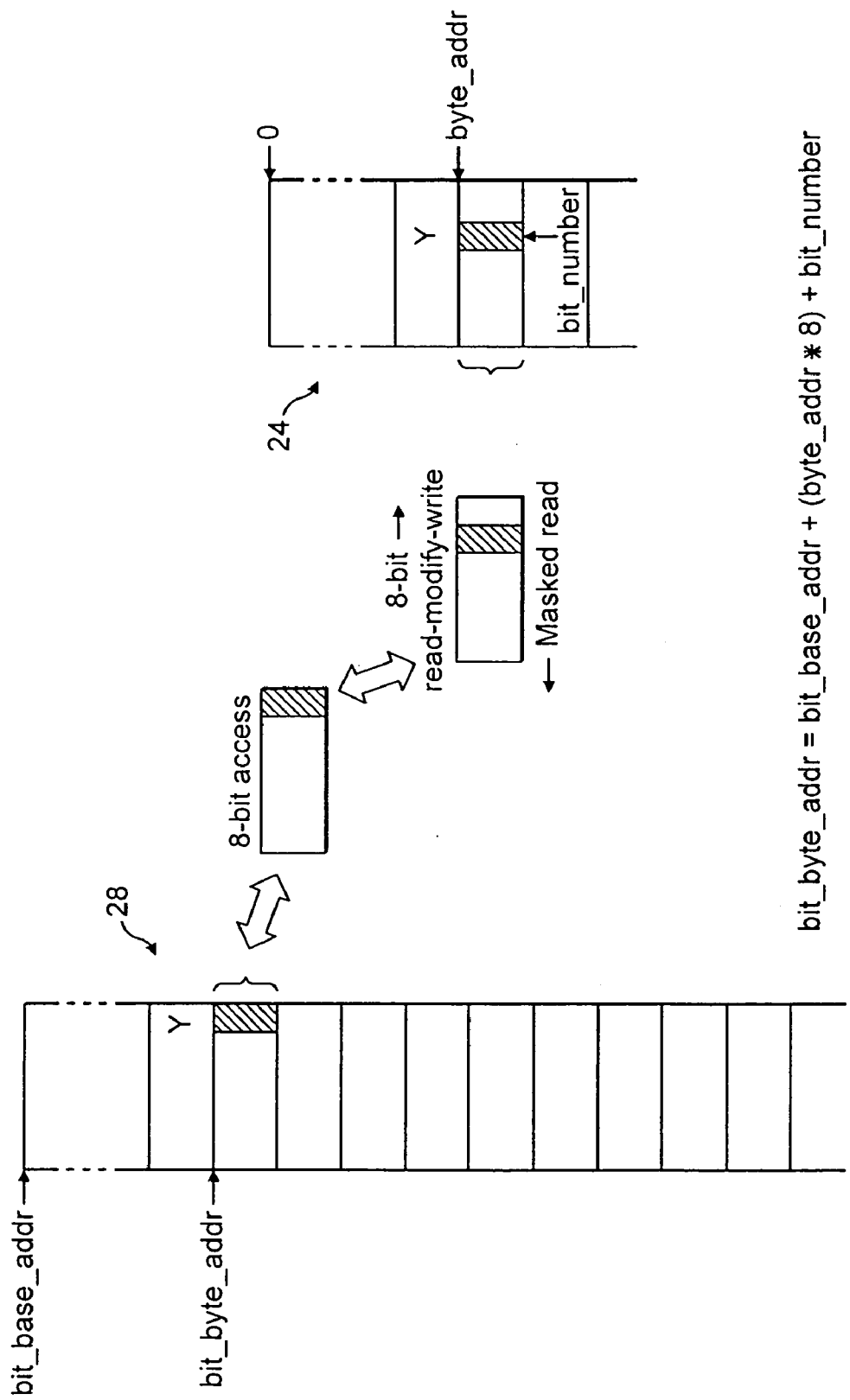
FIG. 3 schematically illustrates the mapping between a first memory address region and a second memory address region.

FIG. 3 schematically illustrates this relationship between data accesses to the bit-band data region 28 and the base data region 24 in more detail. As illustrated, a first data access to the bit-band data region 28 is an 8-bit data access. The least significant bit Y of this data access is the bit which is to be mapped to a bit within the base data region 24. This mapping is performed by the load store unit circuitry 22 of FIG. 1 which performs the conversion illustrated mathematically at the bottom of FIG. 3 to map between byte addresses within the bit-band data region 28 and the byte and bit within to be accessed within the base data region 24.

In different embodiments in which the accesses to the bit band data region are 32-bit word accesses, as part of this operation, the accesses may be converted from a 32-bit accesses to 8-bit access, although this change in access size is optional and in some embodiments the data accesses may more conveniently be left as a 32-bit data accesses to match the existing bus structures and for other reasons. The data accesses may also be realigned as required to match any constraints of the bus structures. As an example, a 32-bit unaligned access may be mapped to a 32-bit aligned access.

In the case of a write being made to the bit-band data region 28, this is mapped into an atomic read-modify-write operation to the base data region 24. The atomic nature of this read-modify-write operation means that it is not possible to interrupt this operation part way through and this is important in order to maintain data integrity and consistency when dealing with interrupt processing. A read operation to the bit-band data region 28 maps to a masked read operation from the base data region 24 such that the appropriate bit within the byte of the base data region 24 is picked out and returned as the least significant bit within the 8-bit result which appears to the program to have been retrieved from the bit-band data region 28. The bit picked out appears in the least significant bit position of the returned data value, irrespective of its position within the byte of the base data region 24. The bit to be written in the case of write accesses also appears at the least significant bit position within the data word written to the bit-band data region 28 even though it maps to a arbitrary position within the byte of the base data region 24.

Figure 4:
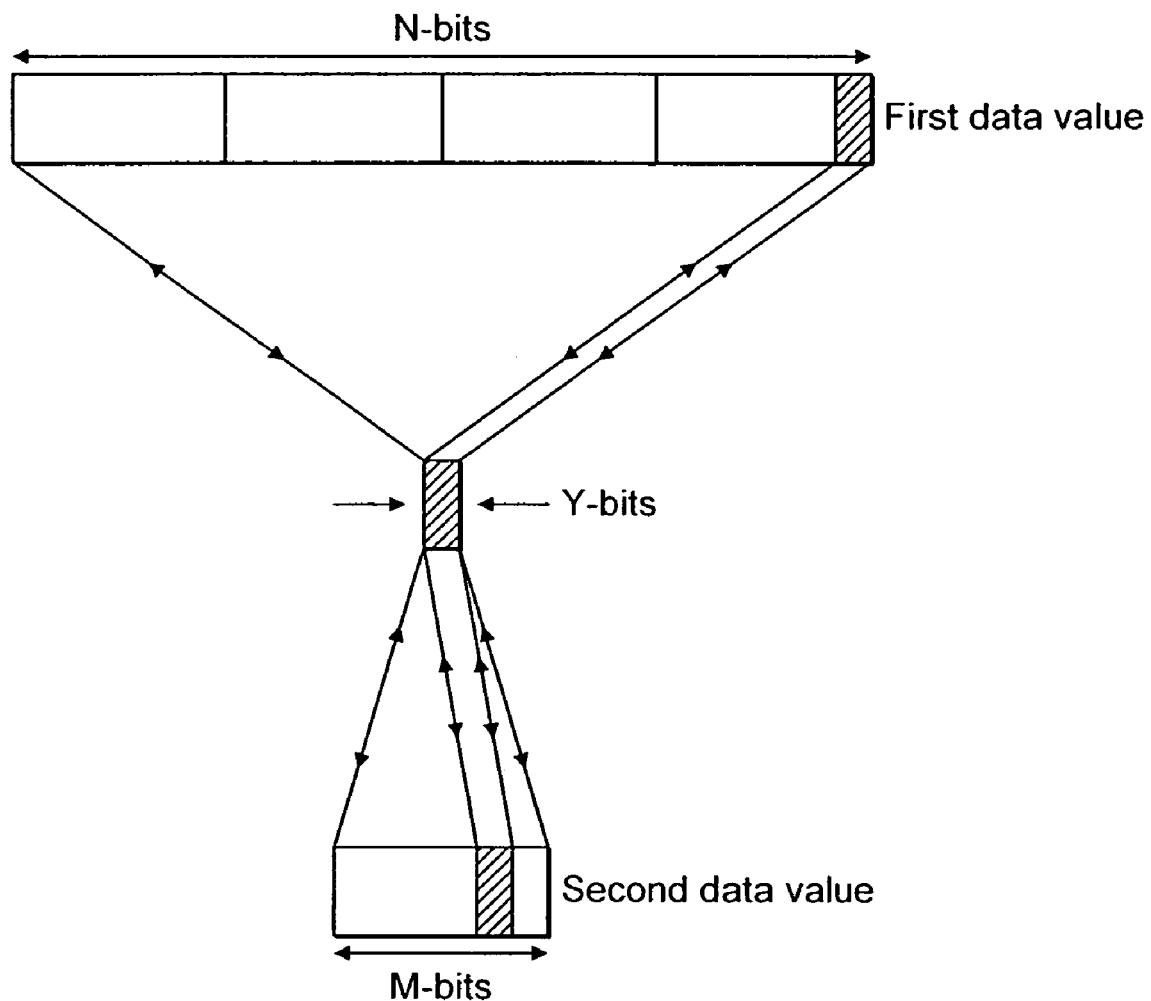
FIG. 4 schematically illustrates the relationship between a first data value and a second data value.

FIG. 4 schematically illustrates the relationship between the data value accessed within the bit-band data region 28 and the data value accessed within the base data region 24 in an alternative way. It will be seen that the data values in these two regions can have differing and effectively arbitrary lengths N, M chosen to suit the particular requirements or to match the existing requirements of the system concerned. The bit or bits being accessed are mapped as illustrated and the relationship can effectively be viewed as a funnel with the bits other than the Y bits to be accessed being set to predetermined values or left unaltered as appropriate depending upon whether the operation is a read or a write. It will be appreciated that in the case of a read of a particular bit value, the returned data value can have its bit positions other than the selected bits being addressed set to a predetermined value, such as 0. Alternatively the bit positions may be used to sign extend the returned data value.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a memory operable to store data values; and
   memory accessing logic responsive to memory access instructions to access data values stored within said memory; wherein
   said memory has a first memory address region and a second memory address region;
   said memory accessing logic is operable, in response to a memory access instruction specifying a first memory access to a first data value within said first memory address region, to convert said first memory access to a second memory access, said second memory access being to a second data value within said second memory address region;
   when said first memory access is a memory write, said second memory access is a read-modify-write memory access in which Y bits within said first data value are written to Y bits within said second data value with those bits within said second data value other than said Y bits being unaltered; and
   when said first memory access is a memory read, said second memory access is a masked read memory access in which Y bits of said first data value are read from Y bits of said second data value and those bits within said first data value other than said Y bits are set to a predetermined value independent of bits of said second data value other than said Y bits.

2. Apparatus as claimed in claim 1, wherein Y is a user programmable value.

3. Apparatus as claimed in claim 1, wherein Y is between 1 and 8.

4. Apparatus as claimed in claim 1, wherein said first data value is an N-bit data value and N is one of 32, 16 and 8.

5. Apparatus as claimed in claim 1, wherein said second data value is an M-bit data value and M is one of 32, 16 and 8.

6. Apparatus as claimed in claim 1, wherein said first memory address region and said second memory address region map to common physical memory storage circuits.

7. Apparatus as claimed in claim 1, wherein said Y bits are contiguous bits within said first data value.

8. Apparatus as claimed in claim 1, wherein said Y bits are a least significant Y bits of said first data value.

9. Apparatus as claimed in claim 1, wherein said memory is byte addressable and Y is less than 8.

10. Apparatus as claimed in claim 1, wherein said read-modify-write memory access is performed as an atomic read-modify-write memory access.

11. Apparatus as claimed in claim 1, wherein if said first memory access is unaligned, then said second memory access is realigned.

12. A method of processing data, said method comprising the steps of:
    storing data values within a memory; and
    in response to memory access instructions, accessing data values stored within said memory; wherein
    said memory has a first memory address region and a second memory address region;
    in response to a memory access instruction specifying a first memory access to a first data value within said first memory address region, converting said first memory access to a second memory access, said second memory access being to a second data value within said second memory address region;
    when said first memory access is a memory write, said second memory access is a read-modify-write memory access in which Y bits within said first data value are written to Y bits within said second data value with those bits within said second data value other than said Y bits being unaltered; and
    when said first memory access is a memory read, said second memory access is a masked read memory access in which Y bits of said first data value are read from Y bits of said second data value and those bits within said first data value other than said Y bits are set to a predetermined value independent of bits of said second data value other than said Y bits.

13. A method as claimed in claim 12, wherein Y is a user programmable value.

14. A method as claimed in claim 12, wherein Y is between 1 and 8.

15. A method as claimed in claim 12, wherein said first data value is an N-bit data value and N is one of 32, 16 and 8.

16. A method as claimed in claim 12, wherein said second data value is an M-bit data value and M is one of 32, 16 and 8.

17. A method as claimed in claim 12, wherein said first memory address region and said second memory address region map to common physical memory storage circuits.

18. A method as claimed in claim 12, wherein said Y bits are contiguous bits within said first data value.

19. A method as claimed in claim 12, wherein said Y bits are a least significant Y bits of said first data value.

20. A method as claimed in claim 12, wherein said memory is byte addressable and Y is less than 8.

21. A method as claimed in claim 12, wherein said read-modify-write memory access is performed as an atomic read-modify-write memory access.

22. A method as claimed in claim 12, wherein if said first memory access is unaligned, then said second memory access is realigned.

* * * * *